June 29, 1965  D. F. REYNOLDS  3,191,710
CANTILEVERED ENGINE SUPPORT
Filed Jan. 2, 1962

DONALD F. REYNOLDS
INVENTOR

BY John R. Faulkner
Clifford L. Sadler
ATTORNEYS

United States Patent Office 3,191,710
Patented June 29, 1965

3,191,710
CANTILEVERED ENGINE SUPPORT
Donald F. Reynolds, Ann Arbor, Mich., assignor to Ford Motor Company, Dearborn, Mich., a corporation of Delaware
Filed Jan. 2, 1962, Ser. No. 163,575
9 Claims. (Cl. 180—64)

This invention relates generally to supporting means for the driving aggregate of a motor vehicle and has particular application to motor vehicles employing unitized body construction.

The vibratory movement of a reciprocating engine and the accompanying power train can transmit objectionable vibrations to a vehicle body and its passengers unless the engine is resiliently supported in the vehicle chassis. This problem is particularly acute in unitized vehicles.

As is well known, the unitized vehicle incorporates no separate frame. Numerous, substantially rigid structural reinforcing members are secured to the thin cross sectional floor pan of the body to provide a rigid structure. It is common practice to secure at least one of the driving aggregate supports to one of the reinforcing members, known to those skilled in the art as a "hard point." If the driving aggregate support does not isolate all of the vibrations from the body structure, the floor pan will act as a sounding board to amplify the engine vibrations. This creates objectionable noise in the passenger compartment of the vehicle.

The optimum points of support of the driving aggregate are at positions that coincide with or are positioned transversely of the longitudinal position of its vibratory nodal points. At these points the vibrations which must be absorbed by the resilient supports are minimal. In a unitized vehicle, however, it is frequently difficult to reconcile the spacial location of the structural hard points and the nodal points of the driving aggregate.

It is, therefore, the object of this invention to provide a support that permits the nodal point of a driving aggregate to be supported from a spaced hard point of a unitized vehicle body structure.

A motor vehicle incorporating this invention has a unitized body structure including a relatively thin cross sectional floor pan having at least one substantially rigid reinforcing member secured thereto. A driving aggregate including an engine is contained in the body structure and has at least one of its vibratory nodal points spaced from the reinforcing member. A cantilevered support has one end thereof secured to the reinforcing member and extends toward the spaced vibratory nodal point of the driving aggregate. Resilient means support the driving aggregate at its vibratory nodal point upon the cantilevered support.

Further objects and advantages of this invention will become more apparent as this description proceeds particularly when considered in conjunction with the accompanying drawings, wherein.

Figure 2:
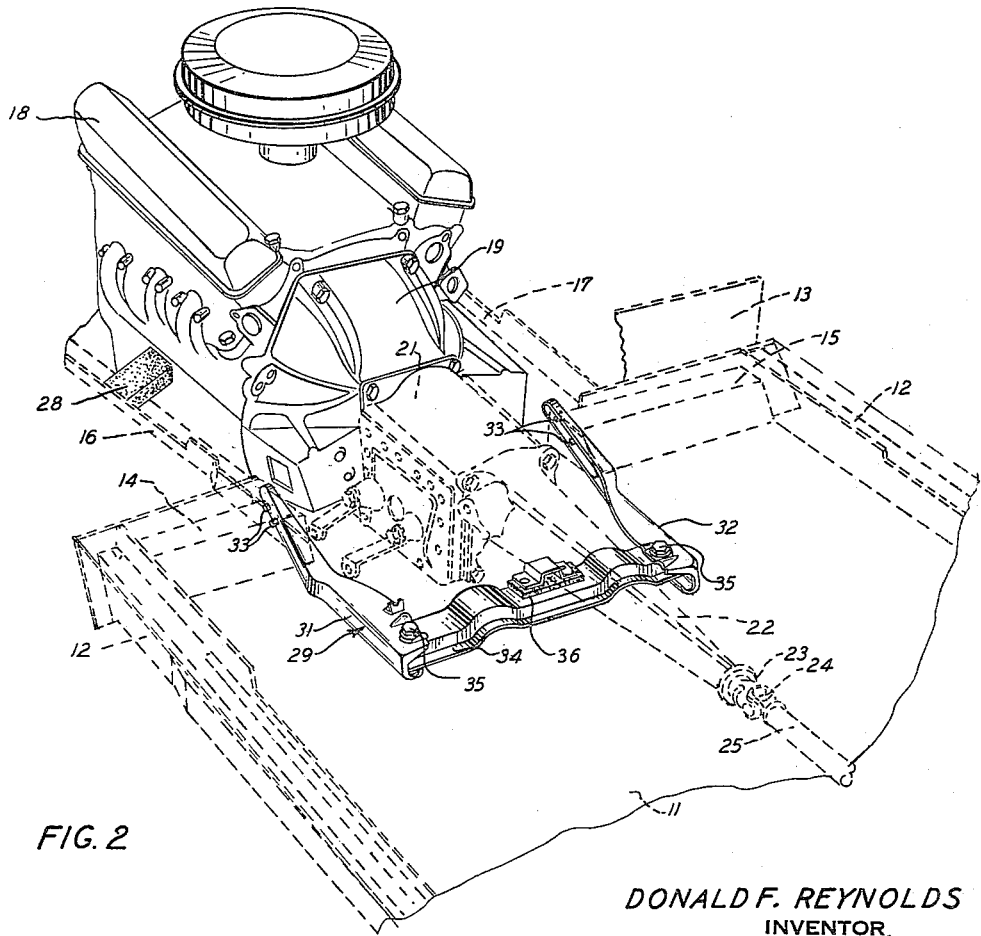
FIGURE 2 is a top perspective view of a portion of a motor vehicle incorporating the invention.

Referring now in detail to the drawings and in particular to FIGURE 2, there is shown a portion of a motor vehicle having a unitized body construction. Portions are in phantom to more clearly show the construction of an embodiment of the invention. The vehicle body includes a thin cross section sheet metal floor pan 11 bounded at the sides by integrally formed rigid box-shaped sill members 12. At the front the floor pan 11 extends upwardly to form a toe board portion 13. Beneath the toe board 13 at each side of the vehicle, substantially rigid torque boxes 14 and 15 are welded to the sill members 12. Extending from the inboard ends of the torque boxes 14 and 15 are front side rails 16 and 17.

Supported within the body structure is a driving aggregate including an internal combustion engine 18, a clutch and clutch housing 19 and a change speed transmission 21 having a tail shaft housing 22. Extending from the tail shaft housing 22 is a power output shaft 23 coupled by a universal joint 24 to a drive shaft 25.

Figure 1:
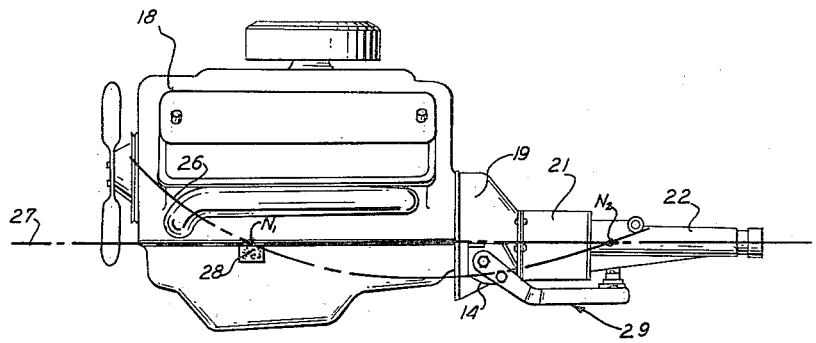
FIGURE 1 is a side elevational view schematically illustrating the driving aggregate of a motor vehicle embodying the invention.

During its operation the driving aggregate is subjected to vibrations generated, at least in part, by the engine 18. The relative amplitudes of the vibrations are indicated in FIGURE 1 by the deviation of a line 26 with respect to a horizontal reference line 27. It will be noted that the vibration line 26 crosses the reference line 27 at two points $N_1$ and $N_2$. These are points of minimum vibration amplitude called nodal points.

The most desirable points of support of the driving aggregate are at the nodal points $N_1$ and $N_2$. Resilient front engine supports 28 are transversely disposed from the longitudinal position of the nodal point $N_1$ and are positioned between the engine 18 and the front side rails 16 and 17 to resiliently support the engine 18 thereon.

The torque boxes 14 and 15 provide suitably rigid structural points from which to support the rear portion of the driving aggregate. As may be seen from FIGURE 1, however, the torque boxes 14 and 15 are longitudinally spaced from the rear nodal point $N_2$. The magnitude of the vibrations of the driving aggregate at a point adjacent to the torque boxes 14 and 15 is so severe that a resilient support could not prevent the transmission of vibrations through the torque boxes 14 and 15 to the floor pan 11. This would create an objectionable noise level in the vehicle interior.

A cantilevered rear engine support assembly, indicated generally at 29, is provided to support the rear nodal point $N_2$ of the driving aggregate from the torque boxes 14 and 15. The rear support 29 includes dogleg-shaped support members 31 and 32 that are positioned at each side of the driving aggregate and extend parallel to its longitudinal axis. The forward ends of the support members 31 and 32 are fastened to the torque boxes 14 and 15, respectively, by bolts 33. The support members 31 and 32 extend under the floor pan 11 with their rear ends positioned lower than the tail shaft housing 22 and terminate contiguous to the rear nodal point $N_2$. An intermediate support member 34 extends beneath the tail shaft housing 22 transversely to the support members 31 and 32. The intermediate support member 34 is connected to the members 31 and 32 by bolts 35. Secured to the intermediate support member 34 directly under the tail shaft housing 22 at the nodal point $N_2$ is a resilient isolator 36. The resilient isolator 36 supports the rear portion of the driving aggregate upon the intermediate member 34.

The intermediate member 34 of the rear support assembly 29 may be dropped from the vehicle by removing the bolts 35. This allows the transmission 21 to be removed from the vehicle without removal of the support members 31 and 32. The resilient isolator 36 may be also similarly removed without necessitating removal of the support members 31 and 32.

It should be readily apparent that a simplified support has been provided for the rear end of a driving aggregate of a motor vehicle employing a unitized body construction. This support permits the driving aggregate to be supported, at its nodal point, directly from the structural member of the vehicle even though the structural member and the rear nodal point are widely spaced.

It is to be understood that the invention is not limited to the exact construction shown and described, but that various changes and modifications may be made without departing from the spirit and scope of the invention as claimed.

What is claimed is:

1. In a motor vehicle, a body structure having a thin cross section floor pan, a driving aggregate including an engine positioned within said body structure, said body structure including integral substantially rigid reinforcing members extending transversely to the longitudinal axis of said driving aggregate at each side thereof at positions spaced from at least one of the vibratory nodal points of said driving aggregate, first and second driving aggregate support members having one end thereof secured to each of said substantially rigid reinforcing members, respectively, and extending substantially parallel to the longitudinal axis of said driving aggregate at each side thereof, a third driving aggregate support member detachably secured to said first and said second driving aggregate support members and extending transversely thereto at a position aligned with said vibratory nodal point, and resilient means supporting said driving aggregate at said vibratory nodal point upon said third driving aggregate support member.

2. In a motor vehicle, a frame and a driving aggregate mounted on said frame, said frame including transversely extending spaced apart frame elements, side rails secured to said elements and extending in a first direction, sill members secured to said elements and extending in a second direction therefrom, said driving aggregate being positioned between said elements and having a first portion connected to said side rails, a support assembly having leg portions connected to said frame contiguous to said elements and extending in said second direction therefrom, a second portion of said driving aggregate being connected to said support assembly, a sheet metal member interconnecting said sill members and overlying a portion of said driving aggregate, said sheet metal member being spaced apart from said leg portions.

3. In a motor vehicle, a frame and a driving aggregate mounted on said frame, said frame including transversely spaced apart frame elements, rearwardly extending sill members secured to the outboard ends of said elements, forwardly extending side rails secured to the inboard ends of said elements, said driving aggregate being positioned between said elements and having a forward portion connected to said side rails, a support assembly having leg portions connected to said frame contiguous to said elements and extending rearwardly therefrom, a rear portion of said driving aggregate being connected to said support assembly, a sheet metal floor pan interconnecting said sill member and overlying a portion of said driving aggregate, said floor pan being spaced apart from said leg portions.

4. In a motor vehicle, a frame and a driving aggregate mounted on said frame, said frame including transversely spaced apart frame elements, rearwardly extending sill members secured to the outboard ends of said elements, forwardly extending side rails secured to the inboard ends of said elements, said driving aggregate being positioned between said elements and having a forward portion connected to said side rails, a horseshoe-shaped support assembly having cantilever leg portions connected to said frame contiguous to said elements and extending rearwardly therefrom, a rear portion of said driving aggregate being connected to said horseshoe-shaped support, a sheet metal floor pan interconnecting said sill members and overlying a portion of said driving aggregate, said floor pan being spaced apart from said leg portions.

5. A motor vehicle comprising a unitized body structure, a driving aggregate positioned within and supported by said body structure, said body structure including a thin cross section floor pan reinforced by first and second integral substantially rigid reinforcing members positioned on each side of said driving aggregate, a portion of said driving aggregate extending beneath said floor pan and defining a vibratory nodal point spaced from said reinforcing member, a first support member having one end thereof secured to said first reinforcing member, a second support member having one end thereof secured to said second reinforcing member, said support members extending from said reinforcing members toward positions aligned with said vibratory nodal point, and means supporting said driving aggregate at said vibratory nodal point upon said support members.

6. A motor vehicle comprising a unitized body structure, a driving aggregate positioned within and supported by said body structure, said body structure including a thin cross section floor pan reinforced by first and second integral substantially rigid reinforcing members positioned on each side of said driving aggregate, said driving aggregate having a portion extending beneath said floor pan and defining a vibratory nodal point spaced from said reinforcing members, a first support member having one end thereof detachably secured to said first reinforcing member, a second support member having one end thereof detachably secured to said second reinforcing member, said support members extending from said reinforcing members toward positions aligned with said vibratory nodal point, and means supporting said driving aggregate at said vibratory nodal point upon said support members.

7. A motor vehicle comprising a unitized body structure, a driving aggregate including an engine positioned in and supported by said unitized body structure, said body structure including a thin cross section floor pan reinforced by first and second substantially rigid reinforcing members positioned on each side of a portion of said driving aggregate, a portion of said driving aggregate extending beneath said floor pan and defining a vibratory nodal point spaced from said reinforcing members, a first driving aggregate support member having one end thereof secured to said first reinforcing member, a second driving aggregate support member having one end thereof secured to said second reinforcing member, said support members extending longitudinally toward positions aligned with said vibratory nodal point and being transversely spaced from the adjacent portion of said driving aggregate, and means supporting said driving aggregate at said vibratory nodal point, said last-named means being detachably secured to said first and second support members for removal of the adjacent portion of said driving aggregate.

8. A motor vehicle comprising a unitized body structure, said body structure comprising a thin cross section floor pan terminating at an upwardly extending toe board, first and second reinforcing members extending transversely from opposite sides of said body toward the center of said body and terminating at spaced locations, said reinforcing members being positioned contiguous to the intersection of said toe board with said floor pan, first and second rail members affixed to said first and second reinforcing members, respectively, said rail members extending from said toe board longitudinally away from said floor pan, a driving aggregate positioned in and supported by said body structure, said driving aggregate having a first portion extending longitudinally between said rail members and a second portion positioned between said reinforcing members and extending longitudinally away from said rail members, said driving aggregate having first and second vibratory nodal points, said second vibratory nodal point falling within said second portion and being spaced longitudinally from said reinforcing members, a first driving aggregate support member affixed to said first reinforcing member and extending longitudinally toward said second vibratory nodal point, a second driving aggregate support member affixed to said second reinforcing member and extending longitudinally toward said second vibratory nodal point, said support members being transversely spaced from said second portion of said driving aggregate, a third driving aggregate support member extending transversely of said first and second support members and being detachably secured thereto, and means resiliently supporting said second portion of said driving aggregate contiguous to said second vibratory nodal point upon said third support member.

9. In a motor vehicle, a frame, a driving aggregate mounted on said frame, said frame including transversely extending spaced apart frame elements, a first pair of side rails secured to said frame elements and extending therefrom in a first direction, a second pair of side rails secured to said frame elements and extending therefrom in a second direction, said second pair of side rails being secured to said frame elements at transversely spaced locations from said first pair of side rails, said driving aggregate being positioned between said elements and having a first portion supported at each side by said first pair of side rails, a support assembly having leg portions connected to said frame contiguous to said elements and extending in said second direction therefrom, and means supporting a second portion of said driving aggregate upon said leg portions.

References Cited by the Examiner

UNITED STATES PATENTS

| 1,652,159 | 12/27 | Baker | 248—3 X |
| 1,753,839 | 4/30 | Skelton | 248—8 |
| 1,890,871 | 12/32 | Trott | 180—64 |
| 2,017,628 | 10/35 | Lancia | 248—7 |
| 2,081,213 | 5/37 | Anibal | 180—64 X |
| 2,111,563 | 3/38 | Kliesrath | 180—64 |
| 2,864,573 | 12/58 | Olley et al. | 248—9 |

FOREIGN PATENTS

| 147,399 | 10/36 | Austria. |
| 439,667 | 12/35 | Great Britain. |

A. HARRY LEVY, *Primary Examiner.*

PHILIP ARNOLD, *Examiner.*